United States Patent [19]

Voxbrunner

[11] Patent Number: 5,024,417
[45] Date of Patent: Jun. 18, 1991

[54] CONTROL CIRCUITRY FOR A SOLENOID OPERATED CONTROL VALVE

[75] Inventor: Walter Voxbrunner, Lohr/Main, Fed. Rep. of Germany

[73] Assignee: Mannesmann Rexroth GmbH, Lohr/Main, Fed. Rep. of Germany

[21] Appl. No.: 501,271

[22] Filed: Mar. 29, 1990

[30] Foreign Application Priority Data

Apr. 7, 1989 [DE] Fed. Rep. of Germany ....... 3911259

[51] Int. Cl.$^5$ .................... F16K 31/06; G05D 13/044
[52] U.S. Cl. .......................... 251/129.04; 251/129.08; 251/129.05
[58] Field of Search ..................... 251/129.08, 129.04, 251/129.01, 129.15

[56] References Cited

U.S. PATENT DOCUMENTS

| | | | |
|---|---|---|---|
| 4,103,695 | 8/1978 | Aono | 251/129.08 X |
| 4,386,626 | 6/1983 | Hehl | 251/129.08 X |
| 4,714,005 | 12/1987 | Leemhuis | 137/624.11 X |

Primary Examiner—Arnold Rosenthal
Attorney, Agent, or Firm—Harness, Dickey & Pierce

[57] ABSTRACT

The invention relates to a control circuitry for a solenoid operated control valve. The invention provides for a simplified means to obtain a constant valve gain and thus a linear valve characteristic by stepwise varying the gain of the input signal to control the stroke of the valve piston. The non-linear valve gain is first measured to obtain gain correcting values which are stored in a table store corresponding to predetermined values of the input signal for controlling the valve. This input signal is delivered by a commercial CNC-control. The input signal is varied by the correcting means so that the input signal is increased in the zero-flow-range of the valve for example. Assuming that the pressure difference across the valve is constant there will be obtained a linear flow characteristic for the valve. The resolution of the corrected input value is responsive only to the resolution of the CNC input valve as the input value is continuously corrected by multiplication between its incremental steps.

4 Claims, 2 Drawing Sheets

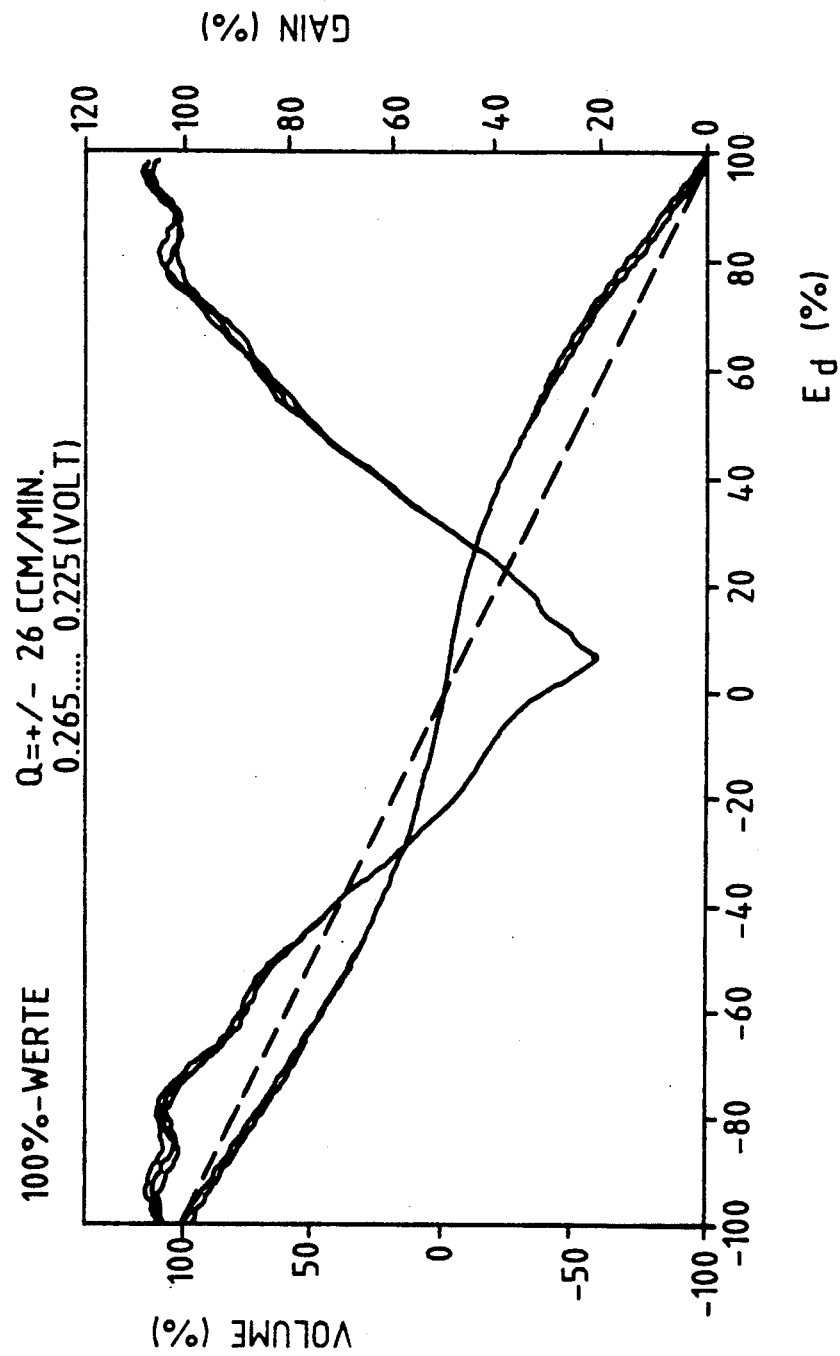

CONTROL CIRCUITRY FOR A SOLENOID OPERATED CONTROL VALVE

The present invention relates to a control circuitry for a solenoid operated control valve.

BACKGROUND OF THE INVENTION

German patent 29 16 172 discloses a control circuitry including a means for providing an electrical input signal representing a desired value which is delivered to a driver stage for operating the control valve to obtain a valve piston setting according to the input signal. To provide a predetermined response of the control valve to the input signal, means are provided for correcting the input signal. Accordingly, the input signal is digitalized in an analog/digital converter and the digital output values are used as addresses to be delivered to a table store for reading out predetermined correction values which are stored at the respective addresses. The correction values read out are added to the digitalized input signal. The corrected input signal at the output of the adding stage is fed to a digital/analog converter delivering an analog control signal for the control valve.

According to a still further prior art valve control (o+p, 29,1985,No. 1, pages 21 to 24 by Scholz "Valve control. . . ") a microprocessor is provided to correct the valve response by varying the input signal by using a number of arithmetical operations such as performing an addition, multiplication or substitution. The prior art results in relatively high expenses due to complicated circuitries.

SUMMARY OF THE INVENTION

It is an object of the present invention to provide a control circuitry of less engineering expenditure but having a capability of resolution of the corrected input signal which is at least as high as provided for by the prior art circuitries.

The improvements achieved by the present invention are obtained by providing a correcting means in the control circuitry, said correcting means including an analog/digital converter, a table store and a digital-/analog converter for processing the input signal by stepwise varying the gain of the input signal by correcting values read from said store.

The present invention is based on the principle that gain values rather than digital absolute values as called for in German patent 29 16 172 are stored in the table store which gain values are multiplied with the input signal. The present invention thus allows elimination of the adding stage or, respectively the microprocessor according to the prior art.

By superimposing an oscillating voltage to the input signal before being fed to the analog/digital converter, wherein the frequency of the oscillating voltage is substantially higher than the self-frequency of the controlled system, the voltage increments between the gain values may be substantially reduced. The reason is that the gain values oscillate with respect to the input signal through a predetermined band width resulting in a mean value of the gain.

By arranging a counter and an adding stage between the analog/digital converter and the table store a mean value of gain may be obtained from a digitally set number of gain values.

The valve is defined by a piston valve having control grooves in the control land of the piston. This allows to obtain soft transitions when the piston starts to move from the neutral position into a working position or when moving the piston from one working position to the other to reverse the flow path. The throttle groove in the control land has a V-shaped cross-section which provides a non-linear flow volume characteristic which is approximately square when the input signal is increased. It is referred to FIG. 2 showing the square-law flow characteristic of the volume as a continuous line. By gain correcting the input signal the flow characteristic is linearized as shown by the dashed line in FIG. 2. The artisan realizes that the low hysteresis in the zero range improves the control characteristic of the valve.

BRIEF DESCRIPTION OF THE DRAWING

FIG. 2 shows the gain and flow characteristic of the valve to be controlled by the control circuitry illustrated in FIG. 1.

DETAILED DESCRIPTION

Figure 1:
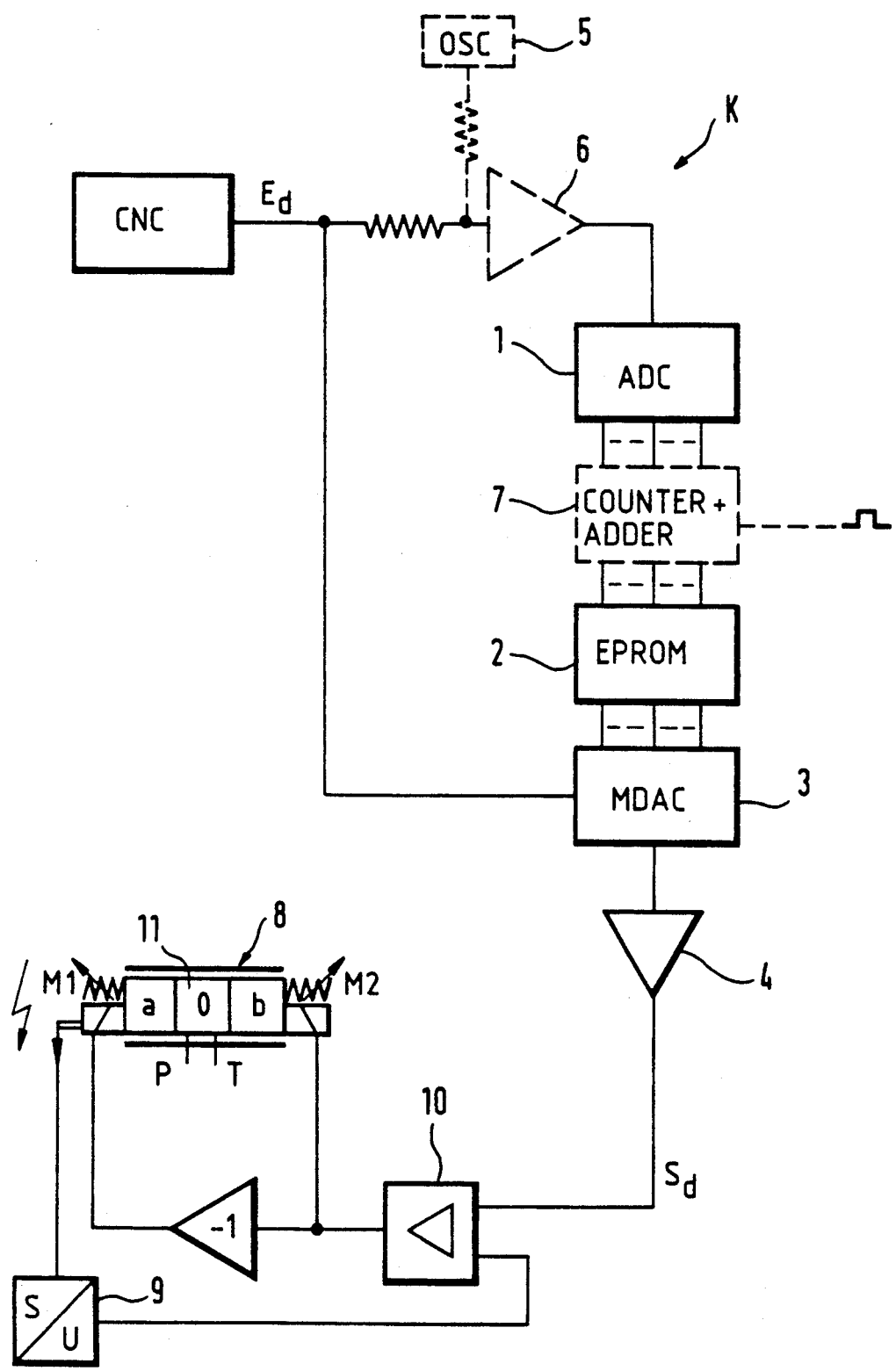
FIG. 1 is a schematic diagram of a control circuitry according to the invention.

Referring now in detail to the drawings, FIG. 1 shows a solenoid-controlled proportional directional valve 8 which is illustrated with its graphic symbol. The piston stroke of the valve 8 is set by a pair of proportional solenoids $M_1$ and $M_2$ each one acting for one of both flow directions.

The position of the valve piston 11 is sensed by a stroke transducer 9 delivering a voltage U proportional to the piston stroke. The actual position signal delivered by the sensor 9 is compared with a desired value $S_d$ representative for the piston stroke to produce an error signal from the differential value to control the proportional solenoids $M_1$ or, respectively $M_2$. Thus a position control loop is provided assuring that the actual value of the piston stroke corresponds to the desired value. As mentioned before, a V-shaped cross-sectional area for the throttle opening of the valve results in an approximately square-law flow relation between the flow volume Q and the desired value $S_d$ for the piston stroke, when the pressure difference $\Delta p$ between the input and output of the valve is maintained constant. This square-law response of the volume Q with respect to the piston stroke $S_d$ is to be compensated for by providing a corresponding inverse square gain of the electrical input value $E_d$ defining the desired value input signal.

As shown in FIG. 1 the input value $E_d$ is delivered by a commercially available CNC-control means. The correcting means generally referred to by the letter K comprises an analog/digital converter 1, a table store 2, a multiplying digital/analog converter 3 and an operational amplifier 4. The input signal $E_d$ delivered from the CNC is digitalized in the converter 1 having an indefinitely small resolution. The digital word is then fed to the addressing inputs of the EPROM 2 in which predetermined gain correcting values are stored. The data outputs of the EPROM 2 are connected to the addressing inputs of the multiplying converter 3 having a reference input to which the input value $E_d$ is applied.

The circuitry above referred to subdivides the analog input value $E_d$ corresponding to the resolution of the converter 1 in steps. Due to the word programmed in the EPROM 2 a predetermined gain is correlated to each respective step. As the signal is varied in steps the corrected input signal $S_d$ is subjected to voltage increments. To minimize the increments an oscillator 5 is provided to superimpose a triangular voltage via the operational amplifier 6 on the input signal $E_d$. The frequency of the triangular oscillator signal is far above the self-frequency of the system to be controlled.

The triangular voltage is converted in the analog/digital converter 1 into a number of addresses. The different addresses are correlated to gain factors which define a mean value of gain for the slower system to be controlled.

Rather than superimposing the triangular voltage, a counter and adder 7 may be connected to the output of the converter 1. The stage 7 may produce a variety of different addresses with respect to the digitalized address defining the input value $E_d$. Accordingly the different addresses again read gain values from the store 2 which gain values define a mean value to decrease the height of discontinuity of the voltage increments By proper selecting the gain factor of the operational amplifier 4 the input value corrected may be amplified or lessened. The resolution of the signal corrected is determined by the resolution of the input value.

FIG. 2 shows a flow diagram of a directional valve having a V-shaped throttle groove in the control piston, wherein the flow-volume is illustrated in response to the electrical input signal $E_d$ and wherein the gain characteristic is shown which results from the respective relation of the flow volume to the value of the input signal $E_d$. FIG. 2 clearly shows that there is a very small gain of approximately 20% in the zero-flow-range and a very high gain of approximately 105% at maximum flow volume. To obtain a proportional control response of the valve according to the dashed line corresponding to a linear flow characteristic, a constant gain is required. This is obtained by the multiplication of the electrical input signal $E_d$ with the valve specific correcting values stored in the EPROM according to the invention.

The invention is not limited to the directional valve shown. Rather the invention may be realized with different control valves as well, such as servo valves, flow valves and pressure valves.

I claim:

1. A control circuitry for a solenoid operated control valve comprising means for correcting the valve characteristic, said correcting means including an analog/digital converter, a table store and a digital/analog converter, to correct the electrical input signal for controlling the control valve by values stored in said table store, characterized by storing gain values in said store and correcting the input value by stepwise varying said input signal by said gain values called from said store.

2. The control circuitry of claim 1, wherein the input signal to the analog/digital converter is superimposed with an oscillating voltage which frequency is far above the self-frequency of the valve-controlled system.

3. The circuitry of claim 1, wherein a counter and adder is connected between the analog/digital converter and the table store to vary the addresses for the table store.

4. The circuitry of claim 1, wherein the valve is defined to be a piston valve having a non-linear flow characteristic.

* * * * *